Feb. 24, 1925. 1,527,699
P. O. PELLAND
SILAGE MACHINE
Filed Oct. 31, 1921 6 Sheets-Sheet 6

Inventor
P. O. Pelland.
By Lacey & Lacey, Attorneys

Patented Feb. 24, 1925.

1,527,699

UNITED STATES PATENT OFFICE.

PHILIP O. PELLAND, OF WALLOWA, OREGON.

SILAGE MACHINE.

Application filed October 31, 1921. Serial No. 511,700.

*To all whom it may concern:*

Be it known that I, PHILIP O. PELLAND, a citizen of the United States, residing at Wallowa, in the county of Wallowa and State of Oregon, have invented certain new and useful Improvements in Silage Machines, of which the following is a specification.

My machine is a machine for harvesting sunflower plants, reducing the plants to silage and delivering them into a vehicle or other receptacle. The object of the invention is to provide a machine which may be drawn over a field and in its progress will sever the stalks of the plants, deliver the plants to a cutter which will thereupon cut them into short lengths, and then convey the cut stalks to a wagon or other receptacle. Another object of the invention is to provide a machine for the stated purpose in which the parts acting directly upon the stalks will be positively operated without being subjected to sudden stoppages or accellerations due to inequalities in the surface of the field, and other objects of the invention are to provide means whereby the stalks will be positively guided and held to the severing mechanism; will be prevented from dropping to the ground after being severed, and will be prevented from clogging any of the moving parts. Other incidental objects of the invention will appear as the description of the same proceeds.

In the accompanying drawings—

In carrying out my invention I employ a platform 1 supported by a front truck 2 and rear ground wheels 3 and adapted to be drawn over a field by a draft team or by a tractor, the present illustration showing whiffletrees 4 to permit the use of draft animals. At one side of the platform is arranged the harvesting mechanism 5 and at the opposite side of the platform is shown a wagon 6 which is to be drawn over the field simultaneously with the platform and the harvesting mechanism and into which the silage is delivered by a rear transverse conveyer 7. The harvesting mechanism 5 is pivotally mounted near its rear end upon the axle 8 of the rear ground wheels and is supported at its front end by a link or hanger 9 which is attached at its lower end to one side bar of the harvesting mechanism and at its upper end to a rearwardly extending crank arm 10 on a rock shaft 11 which is journaled upon the platform 1 and is equipped with a crank arm 12 which normally extends upwardly. The crank arm 12 is connected by a link 13 with a hand lever 14 mounted upon the platform and equipped with the usual latch cooperating with a segment or holding rack whereby it will be locked in a set position. The said hand lever is disposed within convenient reach of the driver's seat 15 which is supported upon the front end of the platform, as shown and as will be readily understood. When the lever 14 is thrown forward, as illustrated, the front end of the harvesting mechanism will be supported above the ground so that the machine may be readily moved from one field to another field or drawn into a storehouse, but when the lever is thrown rearwardly, the front end of the harvesting mechanism will be permitted to rest upon the ground so that, as the machine is then drawn along a row of plants, the gathering arms will pass on opposite sides of the plants so that they will be positively guided to the cutters.

Figure 1:
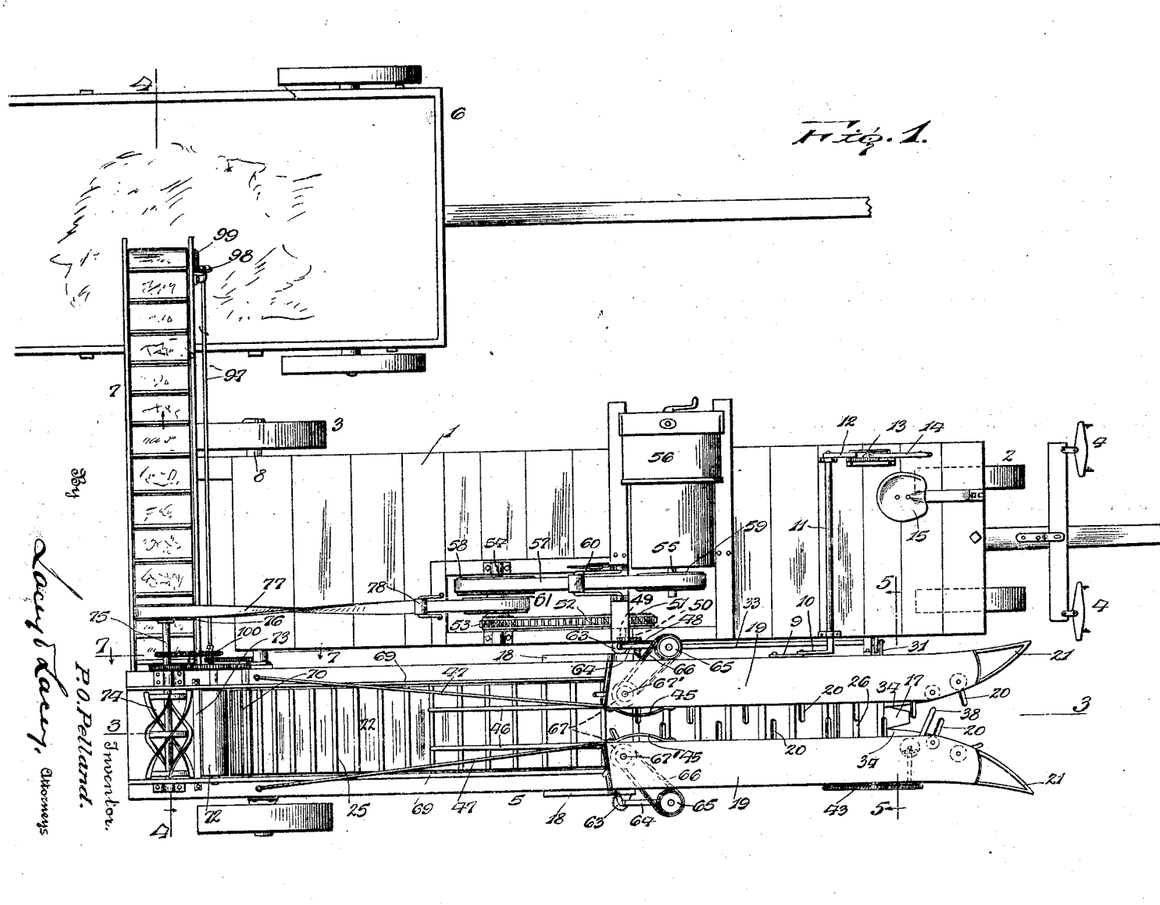
Figure 1 is a plan view of one embodiment of my invention.

The side bars of the harvesting mechanism are disposed parallel with the platform 1, as shown clearly in Fig. 1, and at their front ends are provided with or constructed to form the lower gathering arms 16, the inner opposite edges of which diverge forwardly, as shown clearly in Fig. 1, so that they will readily pass at opposite sides of the row of plants. The extremities of these gathering arms will, therefore, support the stalks so that they will be guided into the throat of the space between the gathering arms to be positively acted upon by the reciprocating cutter 17. Disposed above the side bars of the harvesting mechanism and supported by the posts or standards 18 rising therefrom are the upper gathering arms 19 within which are arranged the gathering chains equipped with stalk-engaging fingers or projections 20 and arranged to travel rearwardly between the gathering arms. These upper gathering arms 19 are inclined downwardly and forwardly, as clearly shown in Figs. 2 and 3, and are supported at their front ends by brackets 21 which rise from the lower gathering arms 16 and serve to bridge the space between the upper and lower arms and thereby prevent the stalks swaying into said space. Upon reference to Figs. 2 and 3, it will be noted that the lower sides of the brackets are inclined upwardly and forwardly to permit them to pass readily over fallen stalks as, owing to the brittle nature of sunflower stalks, it is not feasible to lift and harvest the fallen stalks. Between the side bars of the harvesting mechanism is an endless belt conveyer 22 which is supported upon a rear drum or roller 23 arranged approximately over the rear axle 8 and upon a front drum or roller 24 which is arranged near the reciprocating cutter 17. This conveyer 22 may be constructed of any suitable material as a base or foundation and upon the said foundation material are secured transverse bars or cleats 25 which will positively engage the lower ends of the severed stalks and feed the same to the rear cutter. The front drum or roller 24 is disposed near the cutter 17 and between the said cutter and the drum is arranged a bridge or baffle bar 26 which will be struck by the lower severed ends of the stalks and will retard the passage of the same while the upper ends of the stalks will be permitted to travel ahead slightly under the influence of the fingers 20 and each stalk thereby inclined in order that it may be subsequently deposited upon the carrier or conveyer 22 longitudinally of the same and be presented endwise to the rear feed rollers and cutter. At the ends of the baffle or bridge bar 26, I provide the shields 27 which are secured in any desired manner to the front standards 18 and to the lower gathering arms so as to prevent the stalks swinging laterally beyond the conveyer and, consequently, dropping to the ground and being lost. The reciprocating cutter 17 is preferably a tapered blade or knife of the form now generally employed in harvesters and mowers and is secured to a sickle bar 28 which is slidably supported in suitable guides 29 on the lower gathering arm 16. At the inner end of the bar 28 is a depending lug 30 to which is pivoted one end of a pitman 31 which has its opposite end pivoted upon a crank disc 32 secured upon the front end of a longitudinal shaft 33 whereby rotation of said shaft and crank disc will effect reciprocation of the cutter across the space between the lower gathering arms to cooperate with the fixed knives 34 at the rear ends of the inner edges of said gathering arms whereby to sever the stalks in an obvious manner.

Figures 2, 10:
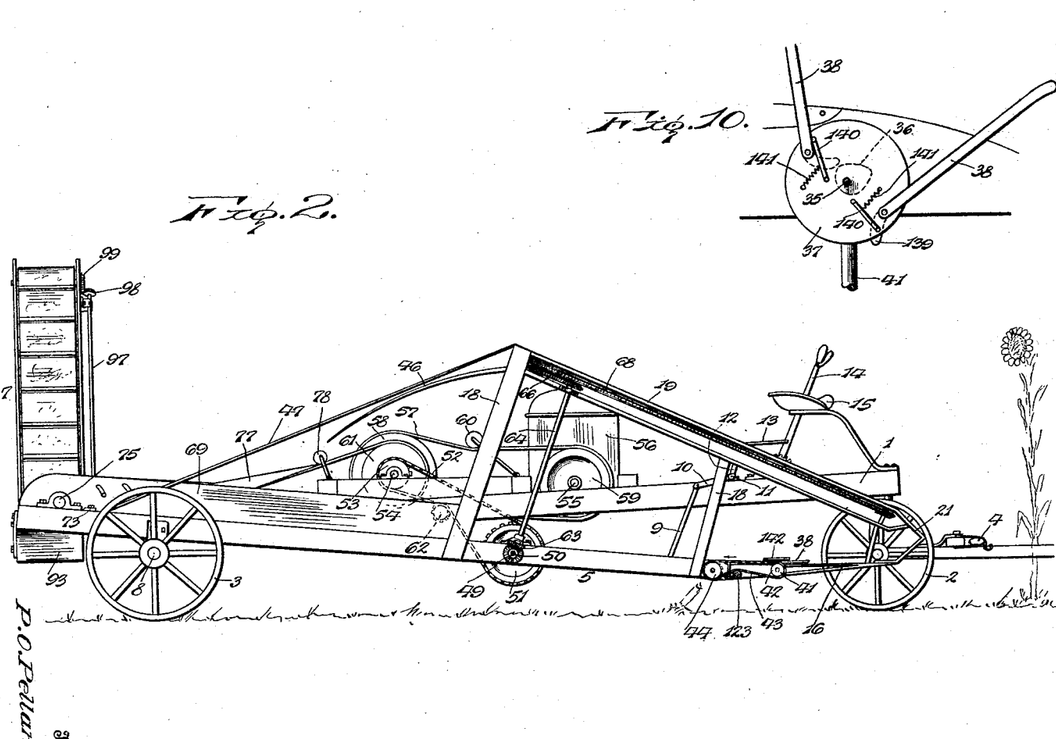
Fig. 2 is a side elevation of the same, some of the protective covering being omitted.
Fig. 10 is a detail plan view of the beater.
Figures 3, 11:
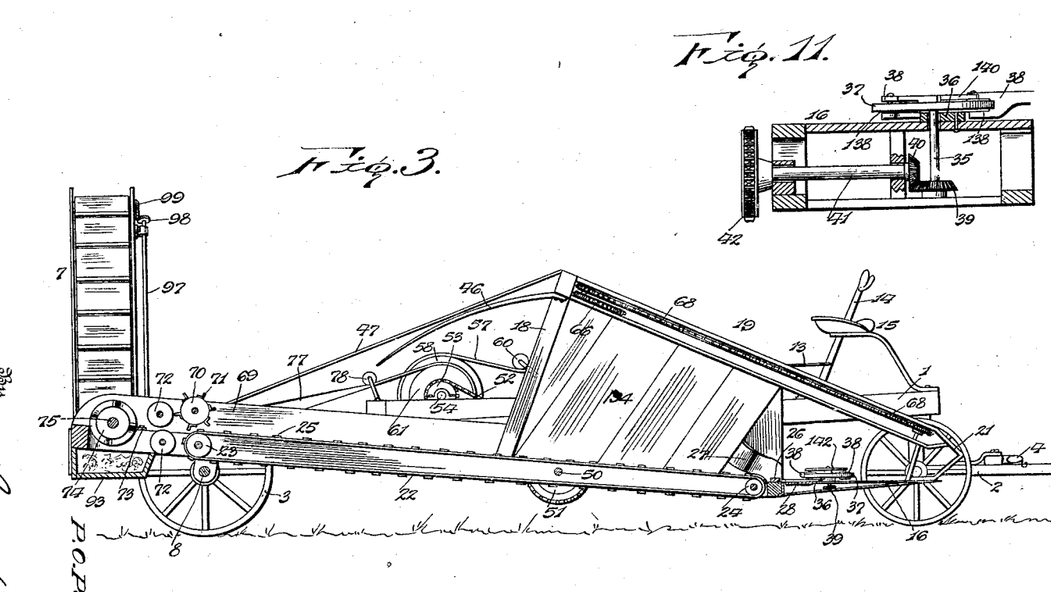
Fig. 3 is a longitudinal section on the line 3—3 of Fig. 1.
Fig. 11 is an enlarged detail section taken on the same plane as Fig. 5 showing the means for operating the beater.
Figure 4:
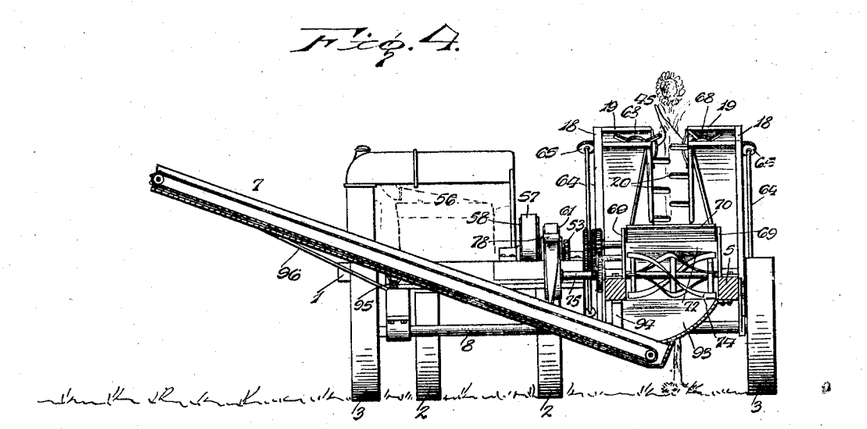
Fig. 4 is a transverse section on the line 4—4 of Fig. 1.
Figure 6:
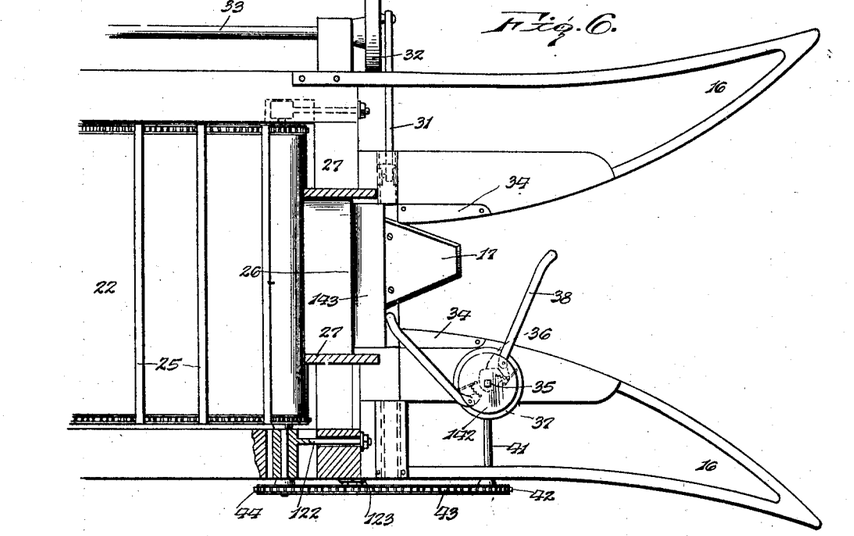
Fig. 6 is an enlarged plan view of the stalk-severing means and the parts immediately adjacent the same.

Upon the outer gathering arm 16, adjacent the stationary cutter 34 thereon, I provide means for positively feeding the stalks to the cutter. This mechanism comprises a vertical shaft 35 journaled in the gathering arm, and a stationary cam 36 formed upon the upper bearing for the shaft. Upon the upper end of this shaft is secured a disc 37 and to the said disc I pivotally attach the beater arms 38 which have their inner ends arranged to ride upon the stationary cam 36 whereby as the disc is rotated, each beater arm will swing to a position in advance of the stalk, and as the machine progresses will hold the stalk to the cutters. Consequently, the stalk cannot be thrown forwardly by the engagement of the reciprocating cutter therewith but will be held positively between the two cutters and effectually acted upon thereby so that each stalk will be severed. The pivotal mounting of each beater arm permits it to remain in engagement with the front side of the stalk notwithstanding the forward movement of the machine, and the rotation of the disc will serve merely to draw the beater arm across the stalk, maintaining the support of the stalk until it has been severed. As the disc then continues to rotate, the beater arm will be swung around and the engagement of the inner shorter end thereof with the stationary cam 36 will restore it to its operative position relative to the stalks. The pivoted end of the beater arm is forked, as shown at 138, so that it may span the edge of the disc 37 and permit the use of an extended pivot and bearing for the arm. The lower extremity 139 of the arm is so shaped as to ride easily upon the cam and hold the arm in working position during the proper period. A presser finger 140 is pivoted at one end of the upper side of the disc 37 adjacent each beater arm, and the free end of the finger is held in engagement with the respectively adjacent beater arm by a spring 141 attached to the finger and the disc as best shown in Fig. 10. A cover plate 142 is carried by the upper end of the shaft 35 above the disc to protect the parts from injury and prevent an accumulation of dirt thereon. When the outer end of a beater arm comes into engagement with a stalk, it tends to move relatively backward but as its inner end is then in engagement with the cam such tendency is overcome and the arm is caused to follow the movement of the disc. The spring-controlled presser finger is brought into engagement with the beater arm as the disc rotates, and the shape of the cam is such that the beater arm will vary its angular position relative to the disc as the stalk approaches the cutters, the tension of the spring 141 gradually increasing. As the stalk reaches the cutters, the end of the beater arm will clear the high part of the cam and, as soon as the arm is free of the stalk, it will swing quickly around under the influence of the spring and again assume a position in which it may engage a stalk. On the lower end of the shaft 35 is secured a beveled gear 39 which meshes with a similar gear 40 on the inner end of the transverse shaft 41 journaled in bearings upon the lower gathering arm and equipped at its outer end with a sprocket wheel 42 around which is trained a sprocket chain 43 extending also around a sprocket wheel 44 connected with the drum 24 which supports the front end of the carrier 22, as shown in Fig. 6 and it may be here noted that the said carrier 22, as well as the rear transverse conveyer to be presently described, comprises parallel chains running over sprockets on the drums supporting said carrier, a fabric or other base between said chains and cross bars secured to and extending between the chains over said fabric base.

From what has been said it will be readily understood that the standing stalks are acted upon by the cutters 17 and 34 so as to be severed and are engaged and supported by the fingers 20 so as to be carried rearwardly from said cutters. The lower ends of the stalks will be retarded by the baffle 26 and the stalks will be prevented from dropping by the carrier 22, the upper run of which is also moving rearwardly, a keeper or guard plate 143 projecting forwardly from the said baffle to hold the reciprocating knife to its work. On the inner opposed edges of the upper gathering arms 19 at the rear ends thereof, I provide the guards or strippers 45 which may conveniently be resilient bowed plates projecting inwardly, as shown most clearly in Fig. 1, whereby the stalks will be prevented from clogging the movement of the supporting fingers and will be stripped therefrom. Extending downwardly and rearwardly from the upper rear ends of the upper gathering arms are the guiding arms 46 which may conveniently be stout wires or rods and which will positively prevent lateral movement of the stalks as they fall to the conveyer 22, it being readily noted upon reference to Fig. 1. that the said guiding arms are secured at their upper ends to the rear ends of the upper gathering arms so that the stalks must pass between said guiding members after being released by the feeding and supporting fingers 20. Guy wires or braces 47 are extended between the rear portions of the side bars of the harvester mechanism and the upper ends of the gathering arms 19 and these guy wires or braces furnish additional means to prevent the stalks dropping over the sides of the carrier 22.

The longitudinal shaft 33 which drives the cutter 17 is disposed between the side of the platform 1 and the adjacent side of the harvesting mechanism, as shown most clearly in Fig. 1, and at its rear end is equipped with a beveled gear 48 meshing with a similar gear 49 on a shaft 50 which is journaled in a suitable bearing upon the platform 1 and is equipped with a sprocket wheel 51 at its inner end. A sprocket chain 52 is trained around the sprocket 51 and around a sprocket 53 on the jack shaft 54, which is mounted in suitable bearings upon the platform and is operatively connected with the driving shaft 55 of an internal combustion engine 56 secured upon the platform. The engine 56 may be of any well-known type and is illustrated in a conventional manner only, and the operative connection between the engine shaft and the jack shaft may be of any preferred type, the drawings showing a belt 57 trained around a pulley 58 on the jack shaft and a pulley 59 on the engine shaft with a belt tightener 60 supported on the platform to bear upon the belt and maintain it in a taut condition at all times. Between the sprocket 53 and the pulley 58, a pulley 61 is secured upon the jack shaft for a purpose which will presently appear. A tightener 62 is mounted upon the platform in position to engage the under run of the chain 52 and thereby take up wear thereon and maintain the tension thereof, as will be readily understood. The shaft 50 extends across the frame of the harvester mechanism between the upper and lower runs of the carrier 22 and is equipped with beveled gears or pinions 49 at each side of the harvester frame, the said beveled pinion at the inner side of the harvester frame meshing with the pinion 48 on the shaft 33, as has been stated. Each pinion 49 also meshes with a beveled pinion 63 on the lower end of a shaft 64 which is supported on the side of the harvester frame and the outer side of the corresponding upper gathering arm 19. On the upper end of each shaft 64 is a sprocket 65 around which is trained a sprocket chain 66 which is also trained around a sprocket 67 at the rear end of the respectively adjacent gathering arm 19. The sprocket 67 at the rear end of the gathering arm is carried by a short shaft 67' journaled in the top and the bottom of said arm and around said sprocket the gathering chain 68 is trained. It will thus be seen that the same element which actuates the reciprocating cutter also actuates the gathering chains which are mounted in the upper gathering arms.

Figure 5:
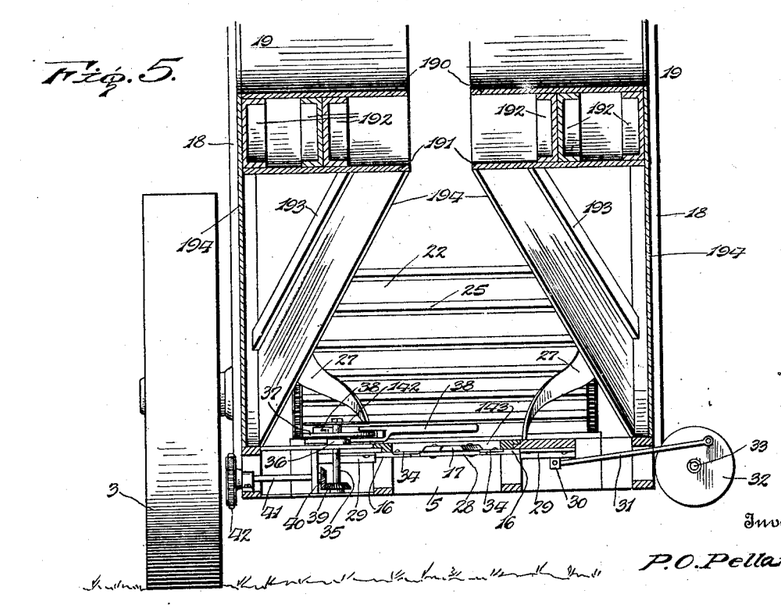
Fig. 5 is a transverse section on the line 5—5 of Fig. 1.

At this point, it may be noted that the upper gathering arms consist of upper and lower parallel sheets or boards 190 and 191 (see Fig. 5) carried by the posts 18 and between which the gathering chains are housed and operate. Bracing bars or brackets 192 are secured to and between the members 190 and 191 and inclined braces 193 extend between the inner edges of the members 191 to the side bars or sills of the harvester main frame to lend rigidity to the structure. Cover plates 194, preferably of sheet metal, are secured upon the said braces 193 and upon the posts 18 so that the stalks fed rearwardly by the gathering chains and the conveyer cannot pass laterally from the machine nor can bushes or other extraneous matter enter the machine through the sides to become entangled in the conveyer or the gathering chains.

Figure 7:
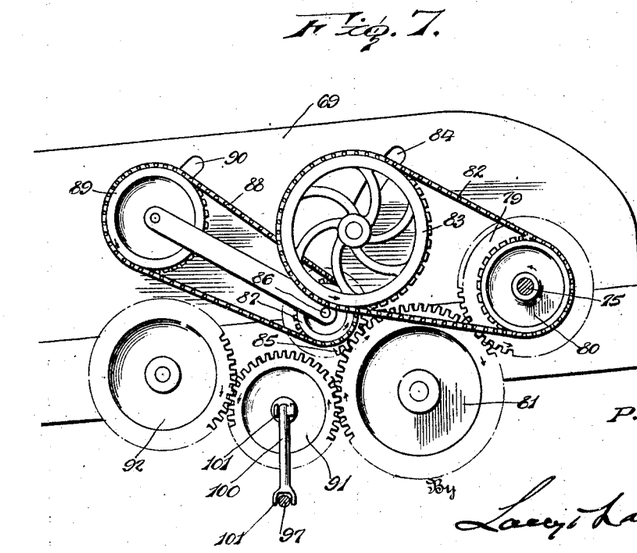
Fig. 7 is an enlarged detail elevation of the means for driving the reducing cutter and the conveyor for delivering the cut stalks to said cutter.
Figure 8:
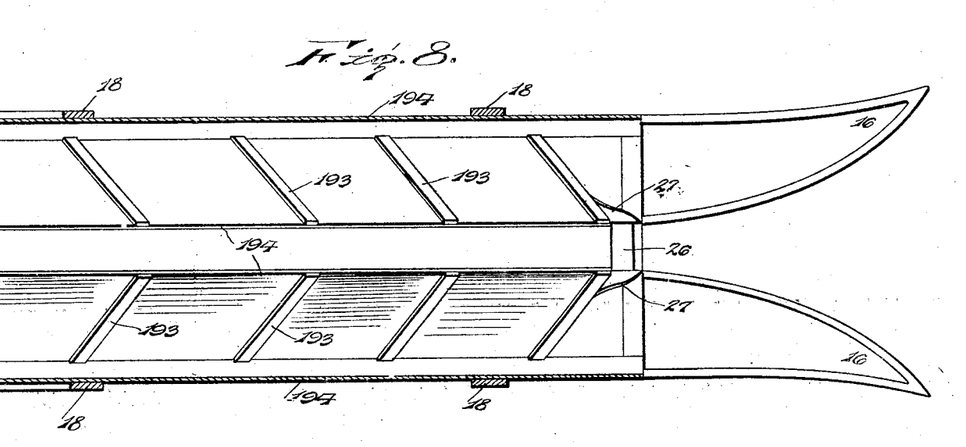
Fig. 8 is an enlarged view, partly in plan and partly in horizontal section of the forward portion of the main frame.
Figure 9:
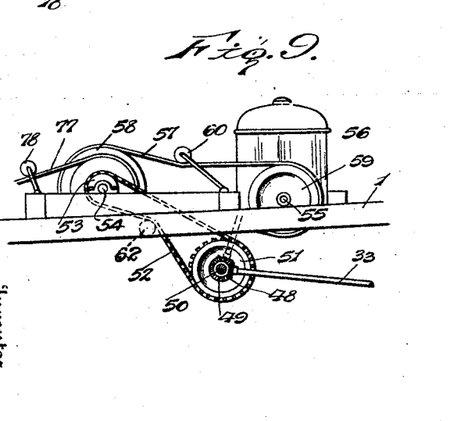
Fig. 9 is a detail side elevation.
Figure 12:
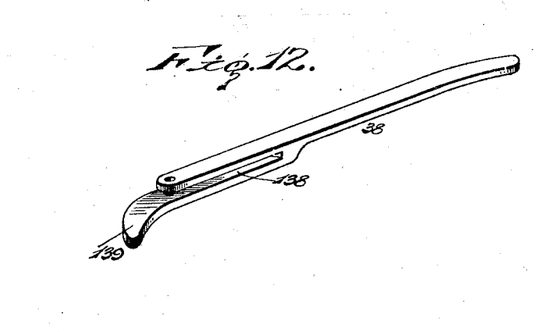
Fig. 12 is a detail perspective view of one of the beater arms.

Side rails 69 are disposed upon the side bars or sills of the harvester frame at the edges of the carrier 22 and extend from the rear standards 18 to the rear ends of the said side bars so that the stalks which have been deposited upon the carrier cannot roll over the edges of the same. Extending between and rotatably mounted in the said rails 69, immediately over the rear drum or roller 23 supporting the carrier 22, is a feed roller 70 which may have its surface provided with longitudinal corrugations or with ribs 71 or otherwise constructed to positively engage the stalks and feed them to and between the smooth-faced feeding and supporting rollers 72 which are disposed in rear of the carrier and the feed roller 70 and are disposed between the harvester frame side bars and between the side rails 69 respectively. Immediately in rear of the feed rollers 72 is a fixed knife 73 disposed parallel with said rollers and in advance of the rotating knife or cutter 74 having spiral blades, as shown most clearly in Fig. 1. This rotating cutter moves so that its blades will work downwardly past the stationary cutter and will thereby cut downwardly through the stalks fed thereto so as to continuously act upon the stalks and cut them into short lengths. The shaft 75 of the cutter 74 is extended inwardly beyond the inner side of the harvester frame and is equipped with a pulley 76 over which is trained a crossed belt 77 which is also trained around the pulley 61 on the jack shaft 54 to drive the cutter from said jack shaft. A tightener 78 suitably mounted upon the platform 1 bears upon the belt 77 so as to maintain the operating tension of the same at all times. The shaft 75 is equipped at the inner side of the harvester frame with a spur gear 79 and a sprocket 80, the gear 79 meshing with a spur gear 81 connected with the lower feed roller 72 so that said roller will be positively driven, while the sprocket 80 is engaged by a chain 82 also trained around a sprocket 83 connected to the upper feed roller 72, and it will be noted, upon reference to Fig. 7, that the said shaft plays in an arcuate slot 84 in the side rail 69 so that the upper feed roller may accommodate itself to the thicknesses of the stalks passing thereunder. The gear 81 meshes with a gear 85 on an idler shaft 86 which is mounted upon the side rail 69 and carries a sprocket 87, a chain 88 being trained around the said sprocket 87 and around a sprocket 89 connected with the feed roller 70, a slot 90 being provided in the rail 69 in order that the roller 70 may rise or fall according to the thicknesses of the stalks passing thereunder. The gear 81 also meshes with a gear 91 which in turn meshes with a gear 92, the said gear 92 being connected with the rear drum 23 of the carrier 22.

The short pieces of the stalks cut off by the knife 74 drop upon a chute 93 carried by the rear end of the harvester frame and are directed by said chute onto the lower end of the rear transverse conveyer 7, said conveyer being carried by a hanger 94 which is secured to and depends from the harvester frame and is connected with the lower portion of said carrier. The carrier is also supported at an intermediate point of its length by a bracket 95 secured upon the rear end of the platform 1 and a brace 96 extending from said bracket to the upper portion of the carrier. A shaft 97 is supported in suitable bearings upon the front side of the elevator or carrier 7 and at its outer or upper end is equipped with a beveled gear 98 meshing with a similar gear 99 operatively connected with the upper bight of the elevator. The lower end of the shaft 97 is connected by a link 100 and universal joints 101 with the gear 91 so that the motion of the cutter shaft 75 is transmitted to the elevator driving shaft 97.

The conveyer 22 is kept taut by tighteners 122 at its front end, and a tightener 123 is provided to take up slack produced in the chain 43 by the action of the tighteners 122.

From the foregoing description, taken in connection with the accompanying drawings, it will be seen that I have provided a very compact mechanism by the operation of which the standing plants will be severed at the desired point above the ground and will be then divided into small pieces suitable for feeding to cattle or other live stock and these small pieces will be delivered into a wagon so that they may be at once transported to a silo or to any other convenient storage room. The apparatus will act positively and automatically and will not be subjected to momentary stoppages or accelerations due to the machine passing over obstructions or down grades in the field, but will operate evenly and smoothly. The driver, after starting the engine, need give the machine no attention except to guide the draft animals or the tractor so that the harvesting mechanism will be caused to pass properly along the row of plants to be gathered.

Having thus described the invention, what is claimed as new is:

1. In an apparatus for the purpose set forth, the combination of lower gathering arms, a cutter at the rear ends of said arms, a conveyer extending rearwardly from said cutter, upper gathering arms supported above the lower gathering arms and extending rearwardly over said conveyer, and terminating at a point between the ends of the conveyer, means for operating the cutter and the conveyer, series of gathering fingers mounted upon said upper gathering arms, means for effecting rearward travel of said fingers between the upper gathering arms, and guide bars secured at their front ends to the rear ends of the upper gathering arms and extending downwardly and rearwardly therefrom toward the conveyer.

2. In an apparatus for the purpose set forth, the combination of a platform, front and rear wheels supporting the platform, the axle of the rear wheels being extended beyond one side of the platform, a harvester mechanism pivotally mounted near its rear end upon the extended axle of the rear platform-supporting wheels, a rock shaft mounted upon the platform near the front end of the same, a hanger connected to said rock shaft and to the front portion of the harvester mechanism, and means on the platform for rocking said shaft whereby to raise or lower the front end of the harvester mechanism.

3. In an apparatus for the purpose set forth, the combination of a harvester frame, a conveyer disposed longitudinally of said frame, gathering and severing mechanism at the front end of said conveyer, a feed roller disposed over the rear end of said conveyer and co-operating therewith, co-operating dividing knives arranged at the rear end of the harvester frame, co-operating smooth-faced feed rollers disposed between said knives and the rear end of the conveyer, a transverse chute under the dividing knives, and a conveyer extending laterally from the harvester frame and having one end arranged under said chute and suitable operating means.

In testimony whereof I affix my signature.

PHILIP O. PELLAND. [L. S.]